United States Patent
Sawyer

(10) Patent No.: US 10,183,556 B2
(45) Date of Patent: Jan. 22, 2019

(54) METHOD FOR REGENERATING ODOR ABSORBENT IN A MOTOR VEHICLE HVAC SYSTEM

(71) Applicant: FORD GLOBAL TECHNOLOGIES, LLC, Dearborn, MI (US)

(72) Inventor: Robert Steven Sawyer, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/611,938

(22) Filed: Jun. 2, 2017

(65) Prior Publication Data
US 2017/0267070 A1 Sep. 21, 2017

Related U.S. Application Data

(62) Division of application No. 14/828,861, filed on Aug. 18, 2015, now Pat. No. 9,688,119.

(51) Int. Cl.
| | |
|---|---|
| *B01D 53/00* | (2006.01) |
| *B60H 3/06* | (2006.01) |
| *B60H 3/00* | (2006.01) |
| *B01D 53/14* | (2006.01) |
| *B01D 53/04* | (2006.01) |
| *B01D 41/00* | (2006.01) |
| *B01J 20/34* | (2006.01) |

(52) U.S. Cl.
CPC .......... *B60H 3/0633* (2013.01); *B01D 41/00* (2013.01); *B01D 53/04* (2013.01); *B01D 53/0438* (2013.01); *B01D 53/0454* (2013.01); *B01D 53/14* (2013.01); *B01J 20/3416* (2013.01); *B01J 20/3483* (2013.01); *B60H 3/0085* (2013.01); *B01D 2253/102* (2013.01); *B01D 2257/90* (2013.01); *B01D 2258/06* (2013.01); *B01D 2259/4009* (2013.01); *B01D 2259/4566* (2013.01); *B60H 2003/0691* (2013.01)

(58) Field of Classification Search
CPC .... B60H 3/0633; B60H 3/0085; B01D 41/00; B01D 53/04; B01D 53/0454; B01D 53/14
USPC ....... 96/143, 144, 146; 55/282.2, 283, 385.3
See application file for complete search history.

(56) References Cited

U.S. PATENT DOCUMENTS

| | | | |
|---|---|---|---|
| 4,530,817 | A | 7/1985 | Holter et al. |
| 5,273,487 | A | 12/1993 | Dauvergne |
| 6,080,059 | A | 6/2000 | Kim |
| 6,197,097 | B1 | 3/2001 | Ertl et al. |
| 6,314,949 | B1 | 11/2001 | DeGrazia, Jr. et al. |
| 7,013,656 | B2 | 3/2006 | Yanagimachi et al. |
| 2002/0139251 | A1 | 10/2002 | Simmons |
| 2016/0288043 | A1 | 10/2016 | Meirav et al. |

FOREIGN PATENT DOCUMENTS

| | | | |
|---|---|---|---|
| DE | 19955253 A1 | | 6/2001 |
| EP | 0715878 A1 | | 6/1995 |
| JP | 2000042092 A | * | 2/2000 |
| JP | 2000127756 A | * | 5/2000 |
| WO | 1998018540 A1 | | 5/1998 |

* cited by examiner

*Primary Examiner* — Robert A Hopkins
(74) *Attorney, Agent, or Firm* — Vichit Chea; King & Schickli, PLLC

(57) ABSTRACT

A method is provided for regenerating an odor absorbent in a motor vehicle HVAC system. That method includes the step of heating and regenerating the odor absorbent using heat from a heater core of the HVAC system.

9 Claims, 6 Drawing Sheets

METHOD FOR REGENERATING ODOR ABSORBENT IN A MOTOR VEHICLE HVAC SYSTEM

This application is a divisional patent application claiming priority to U.S. patent application Ser. No. 14/828,861, now U.S. Pat. No. 9,688,119, filed on 18 Aug. 2015, the full disclosure of which is incorporated herein in its entirety by reference.

TECHNICAL FIELD

This document relates generally to the motor vehicle equipment field and, more particularly, to an apparatus and method for regenerating odor absorbent in a motor vehicle heating, ventilation and air-conditioning (HVAC) system.

BACKGROUND

Today's motor vehicles are commonly equipped with air filters including odor absorbent material, such as activated carbon, to trap odors and prevent them from permeating the passenger cabin of the motor vehicle. Under certain conditions, odors previously trapped in the odor absorbent may outgas into the passenger cabin through the ducts of the HVAC system so that when the doors are opened and people enter the vehicle, unpleasant odors are present.

This document relates to an apparatus and method for regenerating the odor absorbent in a motor vehicle HVAC system that is also specifically adapted to push the odors from the regenerated odor absorbent material outside the vehicle and into the ambient environment after the owner/occupants have left the vehicle.

SUMMARY

In accordance with the purposes and benefits described herein, an apparatus is provided for regenerating an odor absorbent in a motor vehicle HVAC system. That apparatus may be broadly described as comprising a regeneration blower assembly connected between a heater plenum and a fresh air inlet duct of the HVAC system whereby air warmed in the heater plenum is directed through the odor absorbent where it entrains odors before being discharged through the fresh air inlet of the HVAC system. The apparatus also includes a controller.

More specifically, the regeneration blower assembly includes a blower fan controlled by the controller. In addition, the regeneration blower assembly includes a regeneration door displaceable between an opened position and a closed position in response to the controller. Still further, the regeneration blower assembly includes a first duct connecting the blower fan with the heater plenum and a second duct connecting the blower fan with the fresh air inlet duct.

Still further, the controller is operatively connected to a fresh air inlet door of the HVAC system. It should be appreciated, the controller is configured to open the regeneration door, open the fresh air inlet door and activate the blower fan for a predetermined period of time when the ignition system of the motor vehicle is switched off. More specifically, air from the passenger cabin of the motor vehicle is drawn by the blower fan through the heater plenum where that air is warmed. Next, the fan draws the warmed air through the first duct so that it passes the blower fan and is then forced by the blower fan through the second duct and the odor absorbent. The warmed air regenerates the odor absorbent which releases the odors, entraining them into the air stream. The air stream containing the entrained odors is then discharged from the fresh air inlet to the ambient environment outside of the motor vehicle.

Still further, the controller is configured to close the regeneration door, close the fresh air inlet door and deactivate the blower fan after the predetermined period of time has elapsed.

In accordance with an additional aspect, a motor vehicle is provided equipped with the apparatus just described.

In accordance with still another aspect, a method is provided for regenerating an odor absorbent in an HVAC system of a motor vehicle. The method may be broadly described as comprising the step of heating and regenerating the odor absorbent using heat from a heater core of the HVAC system.

More specifically, the method includes performing the heating and regenerating for a predetermined period of time after the ignition system of the motor vehicle is switched off. Further, the method includes using a dedicated blower fan to draw air through a heater plenum of the HVAC system and then force that air through the odor absorbent to regenerate the odor absorbent. Still further, the method includes discharging the air and odors entrained therein through a fresh air inlet of the HVAC system.

More specifically, the method also includes the step of opening a regeneration door leading to the blower fan and opening the fresh air inlet door prior to energizing the blower fan for heating and regenerating. Still further, the method includes closing the regeneration door, closing the fresh air inlet door and deenergizing the blower fan after the predetermined period of time has elapsed. Still further, the method includes utilizing a controller to open and close the regeneration door and the fresh air inlet door and energizing and deenergizing the blower fan.

In the following description, there are shown and described several preferred embodiments of the regeneration apparatus and method. As it should be realized, the regenerating apparatus and method are capable of other, different embodiments and their several details are capable of modification in various, obvious aspects all without departing from the regeneration apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the regeneration apparatus and method and together with the description serve to explain certain principles thereof. In the drawing figures:

FIG. 1b is a schematic illustration of the control system for the regeneration apparatus illustrated in FIG. 1a.

Reference will now be made in detail to the present preferred embodiments of the regeneration apparatus and method, examples of which are illustrated in the accompanying drawing figures.

DETAILED DESCRIPTION

Figure 1A:
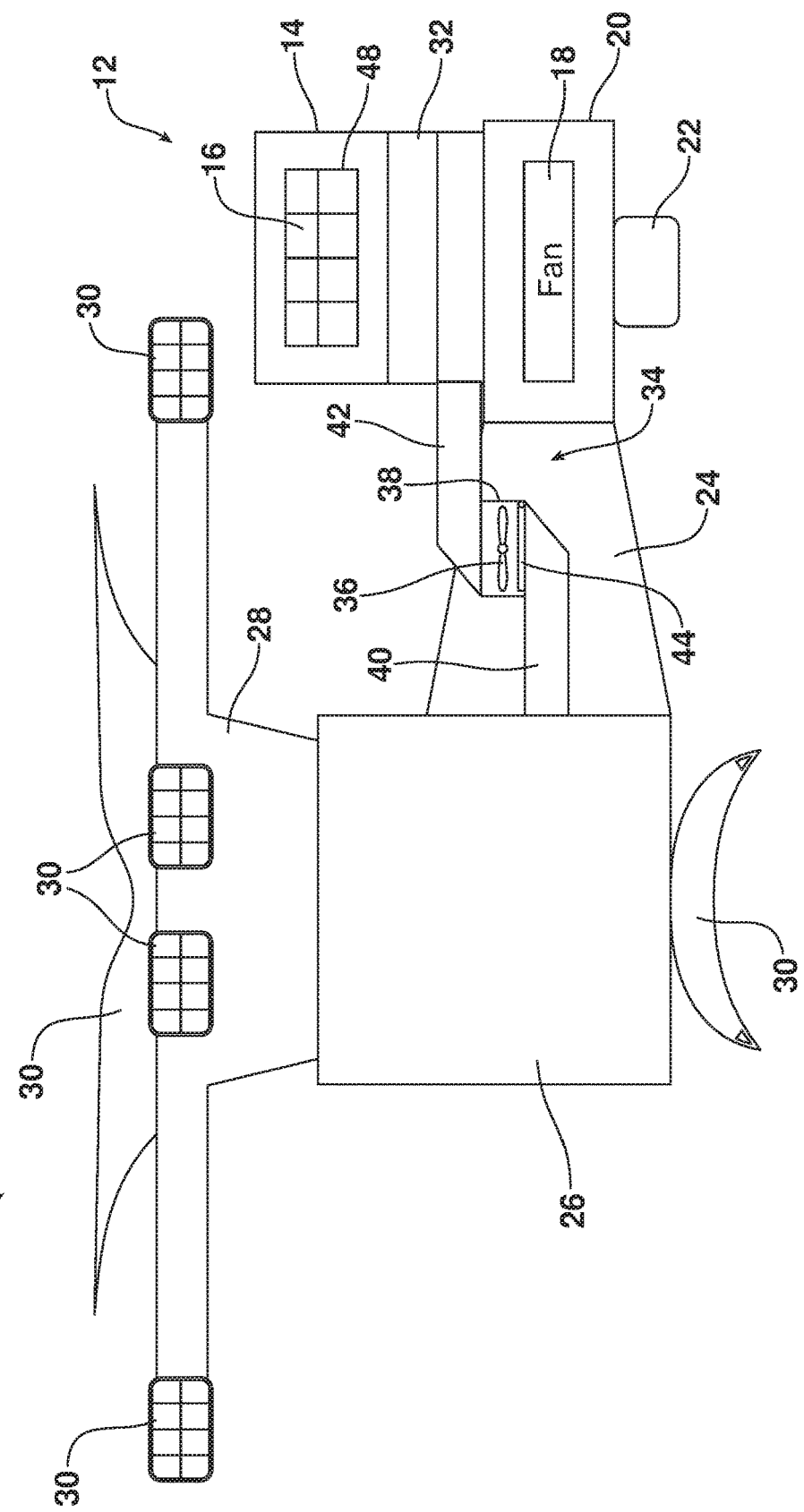
FIG. 1a is a schematic illustration of a motor vehicle HVAC system including the regeneration apparatus that is the subject matter of this document.
Figure 1B:
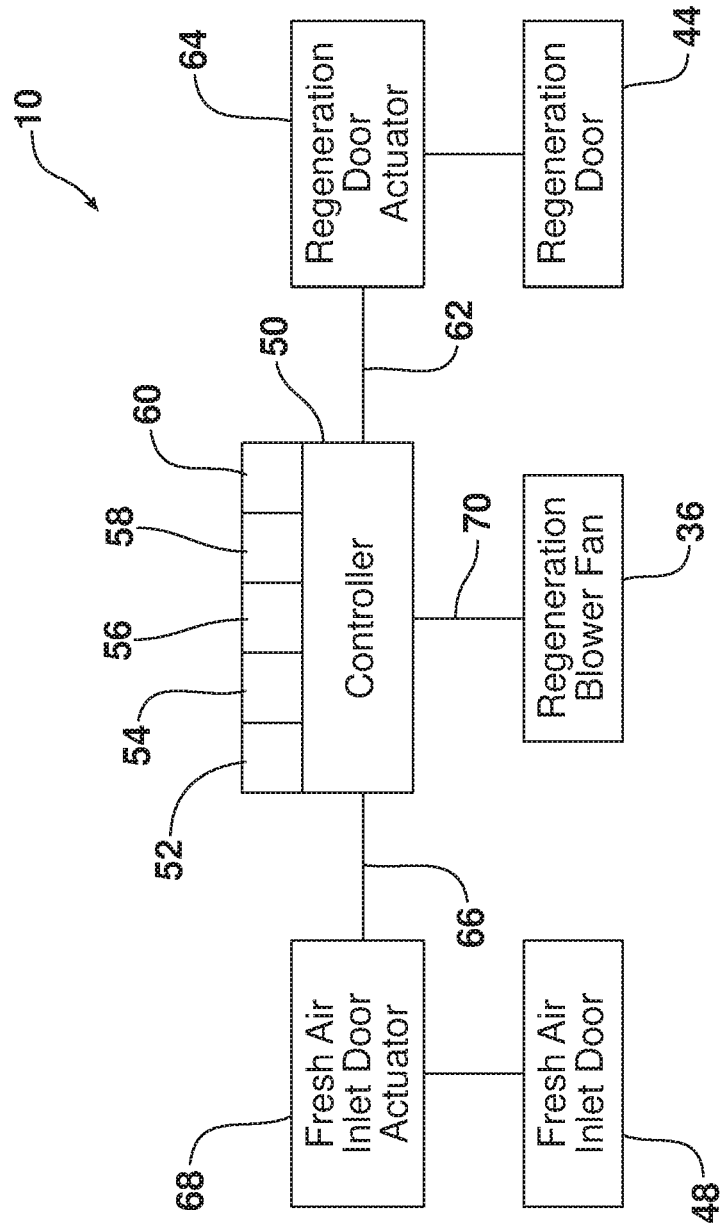

Reference is now made to FIGS. 1a and 1b, which schematically illustrate the apparatus 10 for regenerating an odor absorbent, such as activated carbon, in a motor vehicle HVAC system, generally designated by reference number 12. That HVAC system 12 includes an inlet duct 14 having a fresh air inlet opening 16, a circulation fan 18 held in a fan housing 20 and powered by a fan motor 22, a ventilation manifold 24 for delivering air from the circulation fan 18 to the heater plenum 26 and duct work 28 to deliver treated air to various outlet vents 30 which deliver that air to the passenger cabin of the motor vehicle. A particulate air filter 32, including an odor absorbent such as activated carbon, is provided in the inlet duct 14 between the fresh air inlet opening 16 and the fan housing 20. Thus, air being drawn into the HVAC system 12 of the motor vehicle through the fresh air inlet opening 16 passes through the air filter 32 before being forced by the circulation fan 18 into the cabin of the motor vehicle. This allows odors to be withdrawn from the airstream and captured by the odor absorbent provided in the particulate filter 32 so that those odors are prevented from reaching the occupants of the motor vehicle in the passenger cabin.

The regeneration apparatus 10 that is the subject matter of this document includes a regeneration blower assembly generally designated by reference number 34. As illustrated in FIG. 1a, that regeneration blower assembly 34 is connected between the heater plenum 26 and the fresh air inlet duct 14 of the HVAC system 12.

More specifically, the regeneration blower assembly 34 includes a dedicated regeneration blower fan 36 held in a fan compartment 38. A first duct 40 connects the blower fan 36 and the fan compartment 38 with the heater plenum 26, while a second duct 42 connects the blower fan 36 with the fresh air inlet duct 14. In addition, the regeneration blower assembly 34 also includes a regeneration door 44 that is displaceable between an opened position and a closed position in order to control the flow of air between the first duct 40 and the fan compartment 38. The HVAC system 12 includes a similar door, the fresh air inlet door 48 that is utilized to open and close the fresh air inlet opening 16.

As illustrated in FIG. 1b, the regeneration apparatus 10 also includes a controller 50. The controller 50 may take the form of a dedicated microprocessor, computing device or electronic control unit (ECU). Thus, the controller 50 may comprise one or more processors, one or more memories and one or more network interfaces that all communicate with each other over a communication bus.

The controller 50 includes a first data input 52 for receiving data respecting the status of the ignition system of the motor vehicle. The controller 50 also includes a second data input 54 for receiving data respecting the revolutions being turned by the engine that powers the motor vehicle. In addition, the controller 50 includes a third data input 56 receiving data respecting the occupancy of the motor vehicle. Occupancy status data may be provided by the status of the vehicle door locks, seatbelt sensors, seat occupancy sensors including pressure sensors in the seats, infrared sensors, internal vehicle cameras for monitoring the presence of motor vehicle occupants or the like.

Still further, the controller 50 also includes a fourth data input 58 for monitoring the charge status of the battery of the motor vehicle. In addition, the controller 50 also includes an internal timer 60.

As further illustrated in FIG. 1b, the controller 50 is operatively connected through the control line 62 to a regeneration door actuator 64 that displaces the regeneration door 44 between open and closed positions. As further illustrated, the controller 50 is also connected through the control line 66 to a fresh air inlet door actuator 68. The fresh air inlet door actuator 68 functions to displace the fresh air inlet door 48 between open and closed positions.

As is also illustrated in FIG. 1b, the controller 50 is connected via the control line 70 to the dedicated regeneration blower fan 36. The controller 50 is configured to open the regeneration door 44, open the fresh air inlet door 48 and activate the regeneration blower fan 36 for a predetermined period of time based upon the operation of the timer 60 when the ignition system of the motor vehicle is switched off so that air from the passenger cabin of the motor vehicle is drawn through the heater plenum 26 where that air is warmed. Next, the regeneration blower fan 36 draws that warmed air through the first duct 40 past the open regeneration door 44 into the fan compartment 38. The blower fan 36 then forces that warmed air through the second duct 42 and through the particulate air filter 32.

As the warmed air passes through the particulate air filter 32, the warmed air comes into intimate contact with the odor absorbent. Heat from the warmed air causes the odor absorbent to release previously absorbed odors which are then entrained in the air stream, thereby regenerating the odor absorbent. The air stream, which now entrains the odors, is then forced by the blower fan 36 past the open fresh air inlet door 48 through the fresh air inlet opening 16 into the ambient environment outside of the motor vehicle passenger cabin. Thus, it should be appreciated that odors are prevented from outgas sing into the passenger cabin through the HVAC system.

As should be further appreciated, the controller 50 is also configured to close the regeneration door 44, close the fresh air inlet door 48 and deactivate the dedicated blower fan 36 after the predetermined period of time measured by the internal timer 60 has elapsed.

As should be appreciated, the regeneration apparatus 10 operates in accordance with a method for regenerating odor absorbent in an HVAC system of a motor vehicle. That method may be broadly described as including the step of heating and regenerating the odor absorbent using heat from a heater core or plenum of the HVAC system. More specifically, the method may be described as including the step of performing the heating and regenerating for a predetermined period of time after an ignition system of the motor vehicle is switched off. Further, the method may include using a dedicated blower fan 36 to draw air through the heater plenum 26 of the HVAC system 12 and then forcing that air through the odor absorbent to regenerate the odor absorbent. Still further, the method may include discharging the air and odors entrained therein through the fresh air inlet opening 16 of the HVAC system following regeneration. Thus, it should be appreciated that the method includes opening a regeneration door 44 leading to the blower fan 36 and opening the fresh air inlet door 48 prior to energizing the blower fan 36 for heating and regenerating. Further, the method includes closing the regeneration door 44 and closing the fresh air inlet door 48 and deenergizing the blower fan 36 after the predetermined time has elapsed. As described, all this is done utilizing the controller 50 which (a) opens and closes the regeneration door 44 and the fresh air inlet door 48 by controlling operation of the door actuators 64, 68 and (b) energizes and deenergizes the motor of the blower fan 36.

Figure 2A:
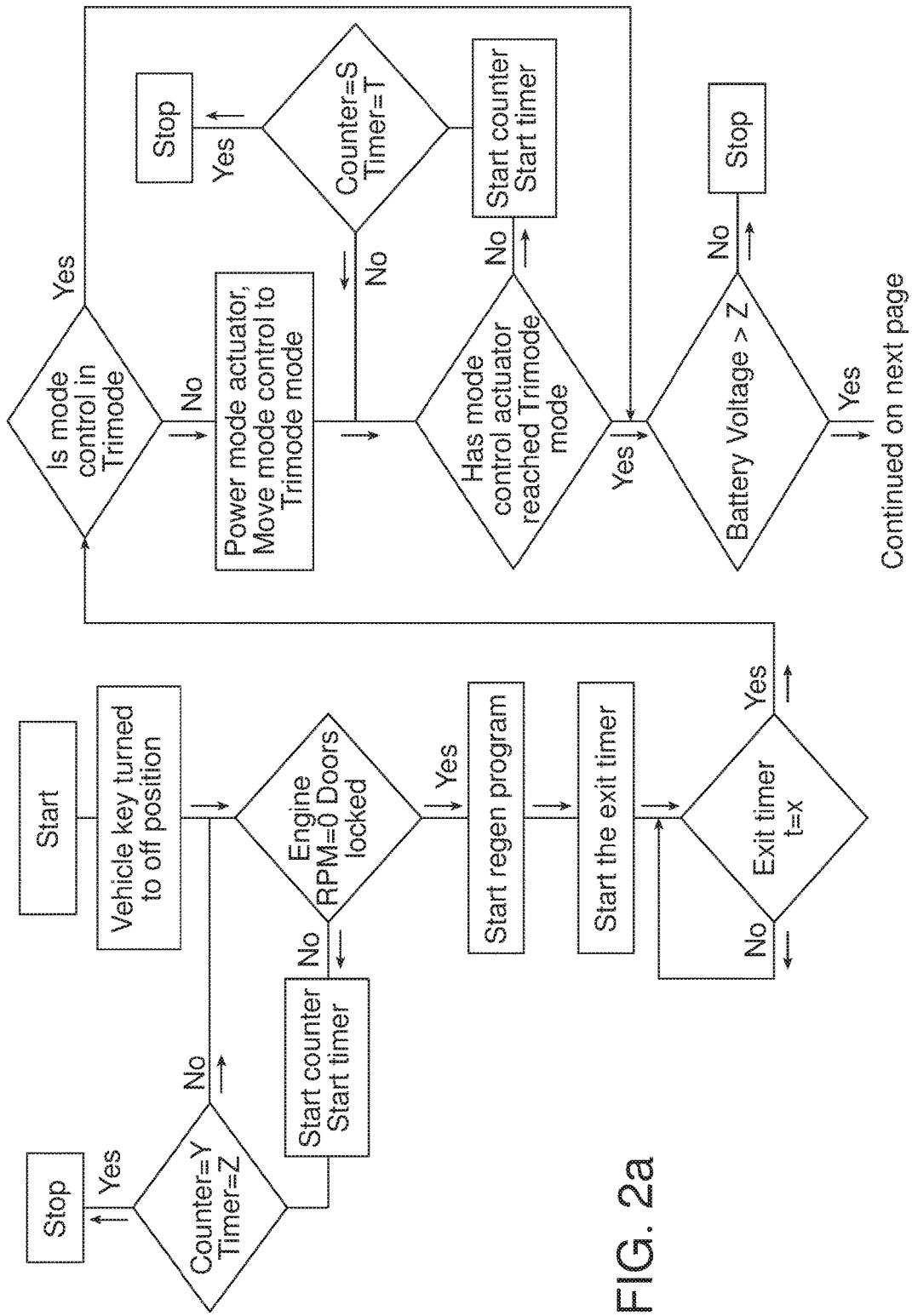
FIGS. 2a-2c are an operations flowchart for the apparatus to aid in illustrating the method that is the subject matter of this document.
Figure 2B:
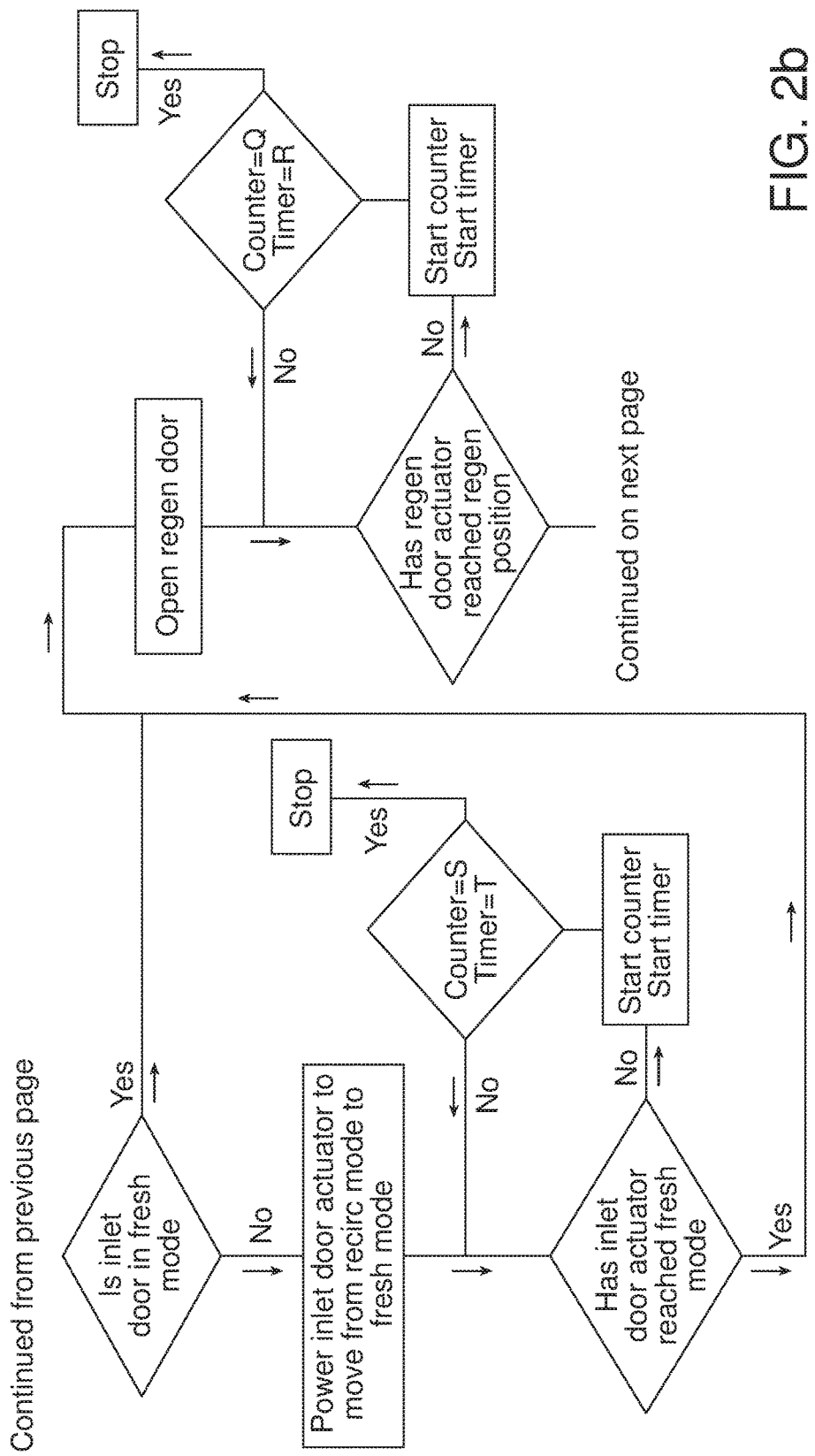
Figure 2C:
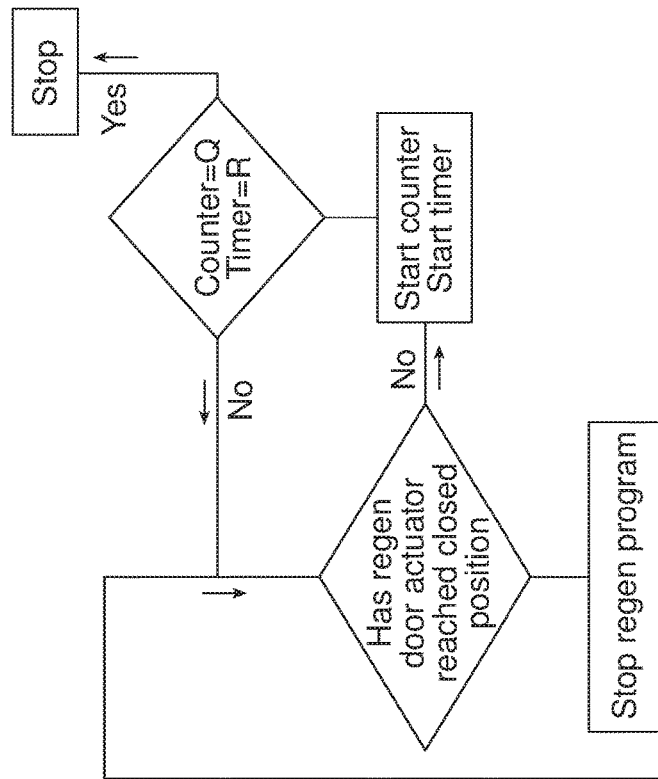
Figure 2C:
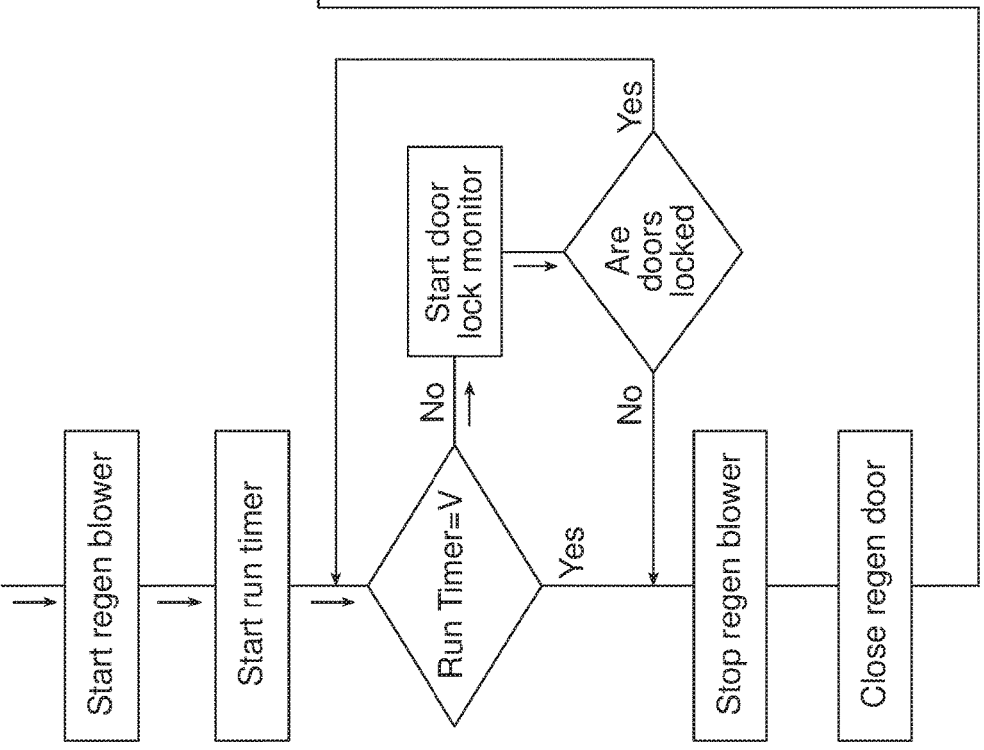

Reference is now made to FIGS. 2a-2c which, taken together, illustrate one possible operations flowchart for the regeneration apparatus 10. As illustrated in FIG. 2a, the regeneration method is initiated when the vehicle key is turned to the off position. This is indicated to the controller at the data input 52. The controller then monitors the data inputs 54 and 56 to confirm that the engine is shut off (engine RPM is equal to zero) and the vehicle is no longer occupied (indicated, for example by one of the occupancy status data sources referenced above). Upon receiving confirmation that the engine is off and the passenger cabin is unoccupied, the controller 50 initiates the regeneration process. Toward this end, the controller 50 determines whether the HVAC system is in the tri-mode position wherein all outlet vents 30 including the window defroster vents, instrument panel vents and floor events are open. If not, the controller 50 takes the necessary steps to open all outlet vents 30 of the HVAC system 12 so as to allow the freest possible flow of air between the motor vehicle cabin and the regeneration blower fan 36.

As further illustrated in FIG. 2a, the controller 50 also checks the fourth data input 58 to confirm that the battery is at a sufficient voltage or charge to allow operation of the regeneration apparatus 10 without significant depletion of the battery.

Next, as illustrated in FIG. 2b, the controller 50 confirms the status of the fresh air inlet door 48 and opens that door if it is closed by means of the fresh air inlet door actuator 68. Next, the controller 50 opens the regeneration door 44 by means of the regeneration door actuator 64.

Next, as illustrated in FIG. 2c, the controller 50 activates the regeneration blower fan 36 which is run for a predetermined period of time based upon the timer 60. When the predetermined period of time has elapsed, the controller 50 deactivates the regeneration blower fan 36 and closes the regeneration door 44 through operation of the regeneration door actuator 64. The regeneration program is then stopped. However, it should be appreciated that for certain applications and systems, the controller 50 would also close the fresh air inlet door 16 if it had been previously closed prior to the initiation of the regeneration program.

Figure 3:
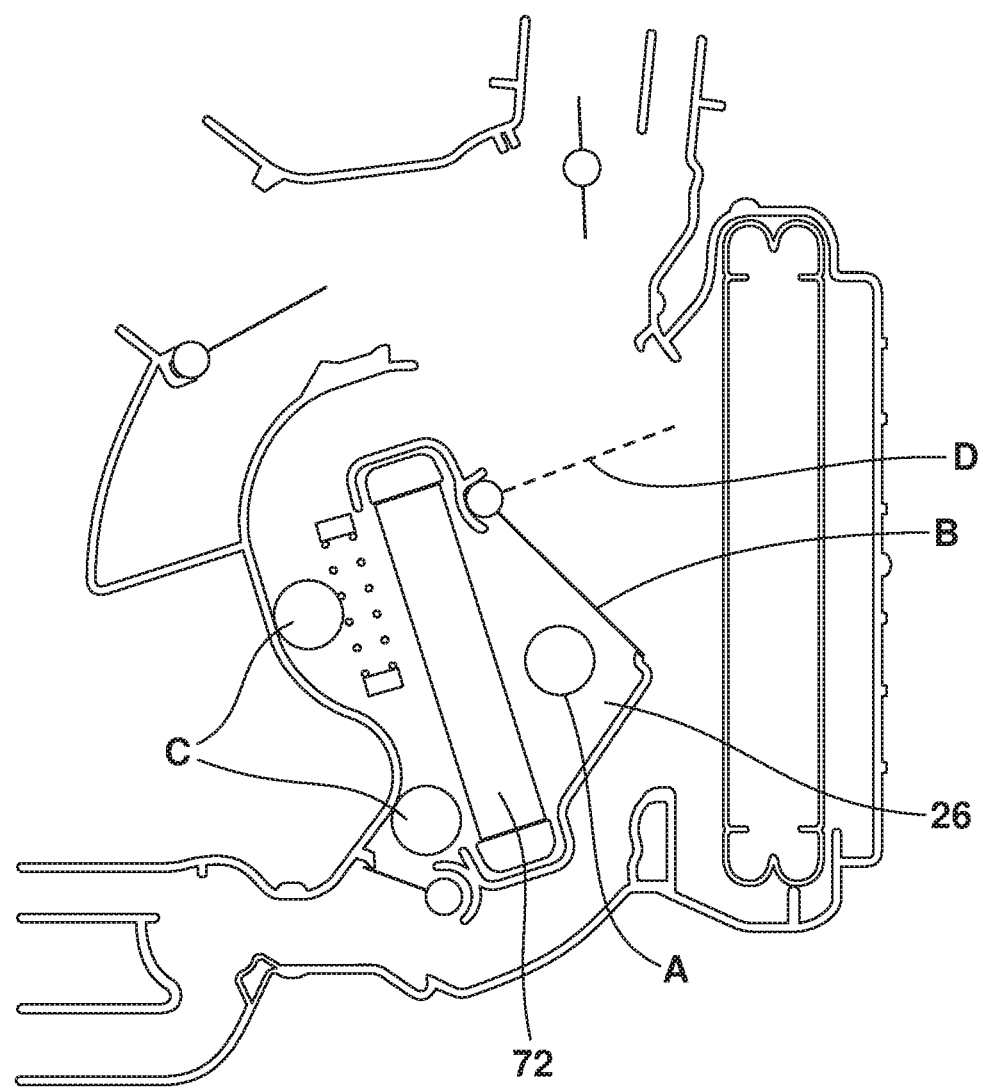
FIG. 3 is a schematic illustration that shows various alternative positions for connection of the first or takeoff duct of the regeneration apparatus to the heater plenum of the motor vehicle HVAC system.

Reference is now made to FIG. 3 which is a detailed cross-sectional view of the heater plenum 26. Reference letter A illustrates a preferred position for the connection of the first duct 40 of the regeneration apparatus 10 in the heater plenum 26 just upstream from the heater core 72 while the reference letter B illustrates a preferred position for the temperature blend door during the regeneration process.

Reference letter C illustrates two possible alternative positions for connection of the first duct 40 to the heater plenum 26. When the first or intake duct 40 is at either of the positions C, it is preferred that the temperature blend door be positioned as illustrated at reference letter D.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method for regenerating an odor absorbent in an HVAC system of a motor vehicle, comprising:
   heating and regenerating said odor absorbent using heat from a heater core of said HVAC system.

2. The method of claim 1, including performing said heating and regenerating for a predetermined period of time after an ignition system of said motor vehicle is switched off.

3. The method of claim 1, including performing said heating and regenerating for a predetermined period of time after an ignition system of said motor vehicle is switched off and a passenger cabin of said motor vehicle is determined to be unoccupied.

4. The method of claim 3, including using a dedicated blower fan to draw air through a heater plenum of said HVAC system and then force that air through said odor absorbent to regenerate said odor absorbent.

5. The method of claim 4, including discharging said air and odors entrained therein through a fresh air inlet of said HVAC system following regeneration.

6. The method of claim 5, including opening a regeneration door leading to said blower fan and opening a fresh air inlet door prior to energizing said blower fan for heating and regenerating.

7. The method of claim 6, including closing said regeneration door, closing said fresh air inlet door and deenergizing said blower fan after said predetermined time has expired.

8. The method of claim 7, including utilizing a controller to open and close said regeneration door and said fresh air inlet door and energize and deenergize said blower fan.

9. The method of claim 1, including opening a regeneration door leading to a blower fan and opening a fresh air inlet door prior to energizing said blower fan for heating and regenerating.

* * * * *